July 10, 1934.    J. L. CREVELING    1,965,690
LUBRICATING DEVICE
Filed Sept. 17, 1931

INVENTOR
JOHN L. CREVELING
BY
ATTORNEY

Patented July 10, 1934

1,965,690

UNITED STATES PATENT OFFICE.

1,965,690

LUBRICATING DEVICE

John L. Creveling, Tucson, Ariz., assignor to The Lubrication Corporation, South Bend, Ind., a corporation of Delaware Application September 17, 1931, Serial No. 563,404

8 Claims. (Cl. 221—47.4)

This invention relates to lubricating guns or compressors and is illustrated as embodied in a hand-operated portable gun of the high pressure type.

An object of the invention is to provide a convenient form of lubricating gun in which the high pressure cylinder is within the lubricant container or reservoir and fed therefrom by a piston movable within the container upon relative movement of the cylinder.

Another object of the invention is to provide a lubricating gun that is compact and handy such as shown in Figure 1 of the drawing.

A feature of the invention lies in the arrangement and construction of the cylinder with reference to the body portion forming the lubricant container or reservoir, the cylinder being preferably concentric with the container and provided with a piston actuated by a relative movement of the cylinder with respect to the container. The relative movements between the parts may be a direct axial sliding, or a combined rotary and axial movement. If desired, means such as screw threads for multiplying the manual force may be provided in the rotary form, and, in the low pressure stage, the threaded engagement may be between either the cylinder and the piston or the cylinder and the container.

Other features and objects of the invention will be apparent from the following description of several embodiments of the invention which I have shown in the accompanying drawing in which.

Figure 1:
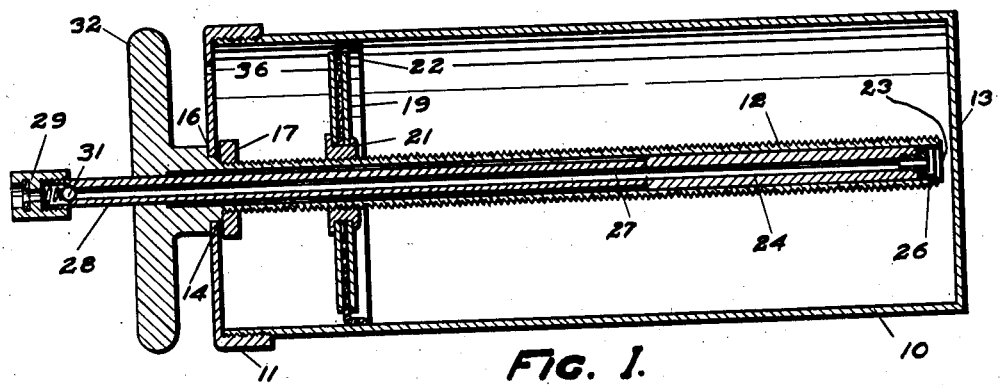
Figure 1 is a longitudinal section showing a lubricating gun constructed according to the invention.

In the construction shown in Figure 1, 10 is a cylindrical lubricant container providing a reservoir and forming the body of the gun to which is secured a threaded cover 11. A threaded cylinder 12 projects within the container to a point adjacent the end of wall 13 and is supported in the cover 11 by bearing portion 14, the cylinder being restrained against axial movement relative to the container by shoulder 16 and threaded collar 17. A piston 19 has a hub 21 in threaded engagement with cylinder 12 and is provided with a washer 22 for forcing lubricant against the end wall 13 and thence into the axial inlet 23 of cylinder 12. Washer 22 is in frictional engagement with the container side wall which prevents rotation of the hub 21 relative to the cylinder. A plunger 24, having a piston 26, reciprocates within the cylinder 12 and discharges lubricant through the conduit 27 upon a thrust movement of the gun. The stem portion 28, of the plunger 24, is preferably provided with a coupling 29 adapted to contact with any desired fitting such as disclosed in my co-pending application Serial No. 5,270, filed January 28, 1925, and if desired, a spring pressed check valve 31 may be provided in conduit 27. A handle 32 forms a guide for the stem 28 and a convenient means of rotating the high pressure cylinder 12 to move piston 22 toward the end wall of the container and force lubricant to the inlet 23 of the cylinder, from which it may be discharged under high pressure by a thrust movement of the gun. If desired, a vent 36 may be provided in the cover 11 for allowing air to enter the container back of the piston 19 and prevent the formation of a vacuum.

Figure 2:
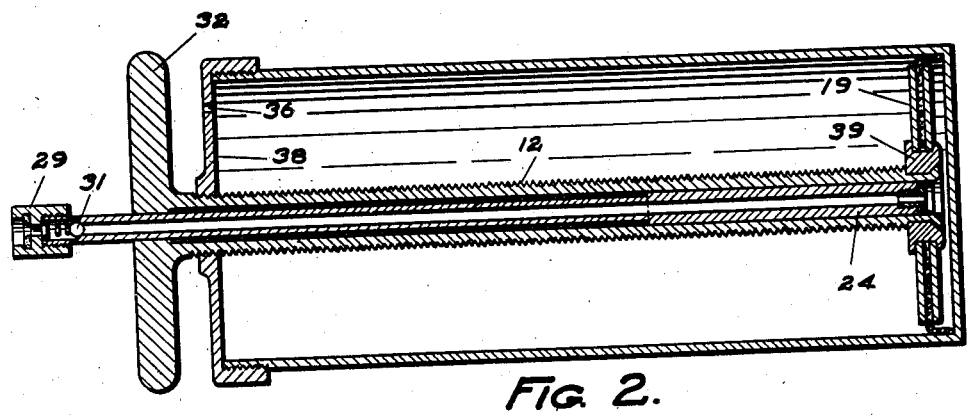
Figure 2 is a modified form of the invention.

In the form shown in Fig. 2, high pressure cylinder 12 has a threaded engagement with removable cover 38 and an axially fixed engagement with the hub 39 of piston 19. In this form of the invention rotation of handle 32 moves the cylinder and piston 19 as a unit, and although piston 19 is secured to the cylinder against axial movement, it is preferably rotatable thereon though it may be fixed to the cylinder if desired.

Figure 3:
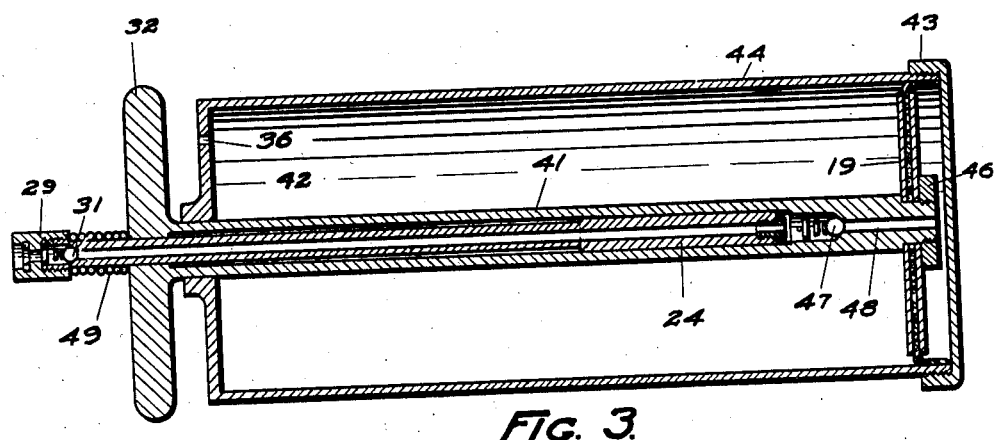
Figure 3 is still another modified form.

In the form shown in Fig. 3, high pressure cylinder 41 is not threaded and has a slidable relation with the end portion 42. A removable cover 43 is secured to the outer end of the container 44, and the piston 19 is secured to the cylinder 41 by a nut 46. A spring pressed check valve 47 is installed in the inlet conduit 48. If desired, a similar check valve may be included in the forms shown in Figs. 1 and 2. A spring 49, if desired, may be disposed between the fitting 29 and the handle 32, the coils of which form a stop for limiting inward movement of the plunger, although any suitable stop may be used if it is desirable to use such a device. Handle 32 may be eliminated in the form shown in Fig. 3, for ordinarily the operation of the gun maintains the piston in contact with the lubricant.

While I have illustrated and described several embodiments of my invention, it is to be understood that this showing and description are illustrative only, and that I do not regard the invention as limited to the forms shown and described, or otherwise, except by the terms of the following claims.

I claim:

1. A lubricating gun comprising, an elongated lubricant container, a high pressure cylinder within the container and rotatably mounted relative thereto, a member fixed to the cylinder and located exteriorly of said container to facilitate manual rotation of the cylinder, a pump piston mounted for reciprocation within the cylinder, said cylinder having an inlet opening communicating with the interior of the container, a piston in the container, and a non-rotative member associated with the piston for engaging with the cylinder threads for moving the piston upon relative rotation between the cylinder and container to urge lubricant into said cylinder inlet.

2. A lubricating gun comprising, a lubricant container, a threaded high pressure cylinder having an inlet, a plunger in said cylinder, said plunger having a discharge opening from the cylinder, a removable cover on the container supporting the cylinder, a piston in the container, and means associated with the piston for engaging the threaded cylinder to advance the piston and force lubricant to the cylinder inlet.

3. A lubricating gun comprising, a lubricant container, a threaded high pressure cylinder rotatably disposed in the container and provided with a lubricant inlet communicating with the interior of the container, means preventing axial movement of the cylinder, a manually operable member fixed to said cylinder and located exteriorly of said container to facilitate relative rotation between the cylinder and container, and a piston within the container in threaded engagement with the cylinder for forcing lubricant into the cylinder inlet.

4. A lubricating gun comprising, a lubricant container, a threaded high pressure cylinder rotatably disposed therein and having an inlet, a container cover having a bearing opening around the cylinder, spaced shoulders coacting with opposite sides of the cover for preventing axial movement of the cylinder, and a piston in threaded engagement with the cylinder for forcing lubricant to the cylinder inlet.

5. A lubricating gun comprising, a lubricant container, a threaded high pressure cylinder rotatably disposed therein and having an inlet, a high pressure piston mounted for reciprocation in said cylinder, said piston being provided with a discharge passageway, means preventing axial movement of the cylinder, and a piston in threaded engagement with the cylinder for forcing lubricant into said cylinder inlet.

6. A lubricating gun comprising, a lubricant container, a threaded high pressure cylinder rotatably disposed therein and having an inlet, a high pressure piston mounted for reciprocation in said cylinder and free to rotate relative thereto, said piston being provided with a discharge passageway, means preventing axial movement of the cylinder, a piston in threaded engagement with the cylinder for forcing lubricant into said cylinder inlet, and a lubricant discharge nozzle rigidly fixed to said high pressure piston and in communication with said discharge passageway.

7. A lubricating gun comprising, a lubricant container, a threaded high pressure cylinder rotatably disposed therein and having an inlet, a high pressure piston mounted for reciprocation in said cylinder and free to rotate relative thereto, said piston being provided with a discharge passageway, means preventing axial movement of the cylinder, and a piston in threaded engagement with the cylinder for forcing lubricant into said cylinder inlet.

8. A lubricating gun comprising, a lubricant container, a high pressure cylinder rotatably disposed in said container and provided with an inlet opening communicating with the interior of the container, means preventing axial movement of the cylinder, a high pressure piston mounted for reciprocation within said cylinder and providing for relative rotation between piston and cylinder, a member fixed to said cylinder and located exteriorly of said container whereby the cylinder and container may be rotated relative to one another, a low pressure piston within the container, and means associated with said low pressure piston and said cylinder for translating rotative movement as between cylinder and container into right line movement of said low pressure piston.

JOHN L. CREVELING.